(12) United States Patent
Ling et al.

(10) Patent No.: US 10,371,989 B2
(45) Date of Patent: Aug. 6, 2019

(54) DISPLAY PANEL AND DISPLAY DEVICE

(71) Applicants: Xiamen Tianma Micro-Electronics Co., Ltd., Xiamen (CN); Tianma Micro-Electronics Co., Ltd., Shenzhen (CN)

(72) Inventors: Ankai Ling, Xiamen (CN); Ling Wu, Xiamen (CN); Poping Shen, Xiamen (CN)

(73) Assignees: Xiamen Tianma Micro-Electronics Co., Ltd., Xiamen (CN); Tianma Micro-Electronics Co., Ltd., Shenzhen (CN)

( * ) Notice: Subject to any disclaimer, the term of this patent is extended or adjusted under 35 U.S.C. 154(b) by 0 days.

(21) Appl. No.: 15/593,505

(22) Filed: May 12, 2017

(65) Prior Publication Data
US 2017/0248812 A1    Aug. 31, 2017

(30) Foreign Application Priority Data

Dec. 27, 2016  (CN) .......................... 2016 1 1228804

(51) Int. Cl.
*G02F 1/1339* (2006.01)
*G02F 1/1335* (2006.01)

(52) U.S. Cl.
CPC .... *G02F 1/13394* (2013.01); *G02F 1/133514* (2013.01); *G02F 2001/13396* (2013.01); *G02F 2001/13398* (2013.01)

(58) Field of Classification Search
CPC .......... G02F 1/13394; G02F 1/133514; G02F 2001/13398
USPC .................................................. 349/155–157
See application file for complete search history.

(56) References Cited

U.S. PATENT DOCUMENTS

| | | | | |
|---|---|---|---|---|
| 2004/0141142 A1* | 7/2004 | Choi | ................... | G02F 1/13394 349/155 |
| 2008/0297715 A1* | 12/2008 | Oh | ...................... | G02F 1/13394 349/155 |
| 2014/0204322 A1* | 7/2014 | Miyake | ................ | G02F 1/1337 349/123 |

FOREIGN PATENT DOCUMENTS

| | | |
|---|---|---|
| CN | 1501129 A | 6/2004 |
| CN | 100371780 C | 2/2008 |
| CN | 101315496 A | 12/2008 |
| CN | 100565306 C | 12/2009 |

* cited by examiner

*Primary Examiner* — Charles S Chang
(74) *Attorney, Agent, or Firm* — Anova Law Group, PLLC

(57) ABSTRACT

The present disclosure provides a display panel and a display device. The display panel includes a first substrate, a second substrate located opposite to the first substrate, and a plurality of first photo spacers located between the first substrate and the second substrate. At least three of the first photo spacers define a repeating unit. The repeating unit comprises a first repeating unit arranged in a first shape, and the first shape comprises a regular polygon or a circle. The display may improve the pressure resistance of the display panel and prevent the mura effect of the display panel.

17 Claims, 16 Drawing Sheets

DISPLAY PANEL AND DISPLAY DEVICE

CROSS-REFERENCES TO RELATED APPLICATIONS

This application claims the priority of Chinese patent application No. CN201611228804.2, filed on Dec. 27, 2016, the entire content of which is incorporated herein by reference.

FIELD OF THE DISCLOSURE

The present disclosure relates to the field of display technology and, more particularly, relates to a display panel, and a display device.

BACKGROUND

In the field of liquid crystal display, the liquid crystal display device generally includes the color film substrate and the array substrate arranged oppositely. When the color film substrate is aligned and attached to the array substrate, the photo spacers, which play a role of supporting, are required between the array substrate and the color film substrate. The photo spacers are compressed for supporting the display panel. The photo spacers mainly play the role of supporting the liquid crystal box and are used for prompting the pressure resistance of the display panel.

In order to further improve the pressure resistance of the display panel, the two following ways are usually adopted: one is improving the pressure resistance of the photo spacers, and the other is dispersing the external pressure by designing a reasonable distribution structure of the photo spacers. However, the conventional design of the photo spacers cannot reasonably disperse the external pressure, and thus the pressure resistance of the display panel is reduced. In addition, due to the unreasonable photo spacer design, when the liquid crystal display panel is extruded by external pressure, the deformation amount at the extrusion position may cause the inclination angle of the liquid crystal molecules to change greatly, and the mura effect may occur.

Therefore, it is desired to provide a new distribution structure or design of the photo spacers to be used for improving the pressure resistance of the display panel. The disclosed display panels and display devices are directed to solving at least partial problems set forth above and other problems. It should be noted that, the information disclosed in the background section is only used to enhance understanding of the background of the present disclosure, and may thus include existing information readily known to those ordinarily skilled in the art.

BRIEF SUMMARY OF THE DISCLOSURE

One aspect of the present disclosure provides a display panel. The display panel includes a first substrate, a second substrate located opposite to the first substrate, and a plurality of first photo spacers located between the first substrate and the second substrate. At least three of the first photo spacers define a repeating unit. The repeating unit comprises a first repeating unit arranged in a first shape, and the first shape comprises a regular polygon or a circle.

Another aspect of the present disclosure provides a display panel. The display panel includes a first substrate, a second substrate located opposite to the first substrate, a plurality of first photo spacers located between the first substrate and the second substrate, and a second photo spacer located between the first substrate and the second substrate. The plurality of first photo spacers define a repeating unit arranged in a first shape. The first shape comprises a regular polygon or a circle. A height of the second photo spacer is lower than a height of the first photo spacer.

Another aspect of the present disclosure provides a display device. The display device includes a display panel. The display panel includes a first substrate, a second substrate located opposite to the first substrate, and a plurality of first photo spacers located between the first substrate and the second substrate. At least three of the first photo spacers define a repeating unit. The repeating unit comprises a first repeating unit arranged in a first shape, and the first shape comprises a regular polygon or a circle.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments consistent with the present disclosure, all of which are within the scope of the present invention.

Figure 1:
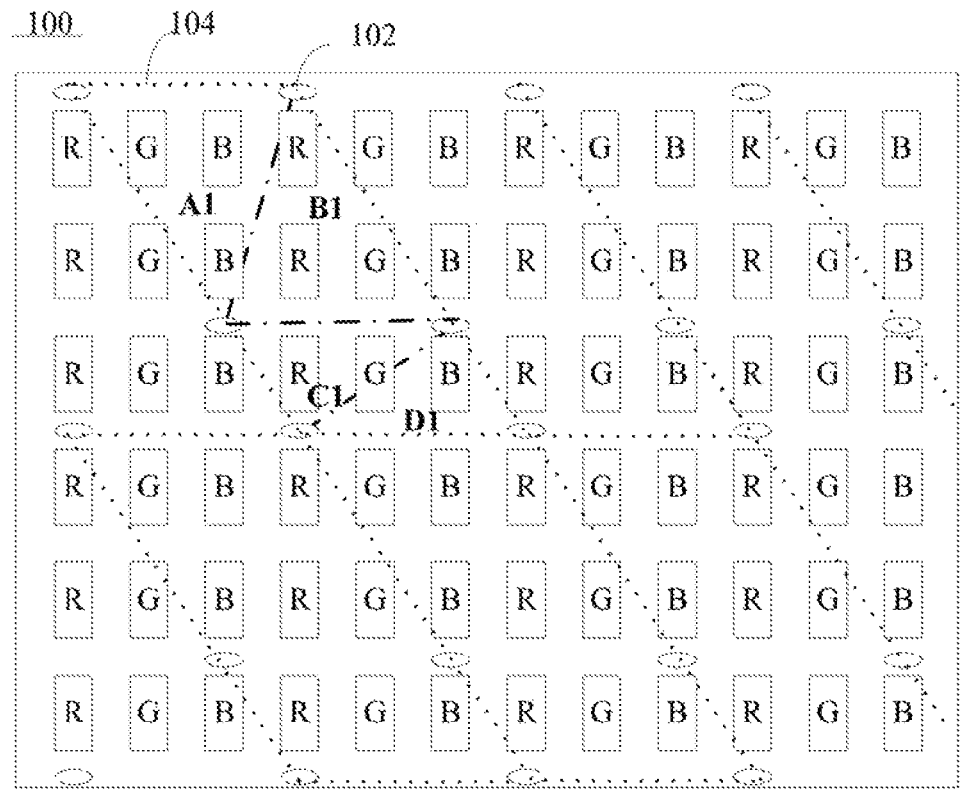
FIG. 1 illustrates a schematic diagram of a distribution structure of photo spacers in a conventional display panel.

FIG. 1 illustrates a schematic diagram of a distribution structure of photo spacers in a conventional display panel. As shown in FIG. 1, the repeating unit 104 composed of six photo spacers 102 arranged in a parallelogram is taken as an example, and the repeating unit 104 is divided into four regions (for example, A1, B1, C1 and D1). When the C1 region or the D1 region of the display panel 100 is pressed by the external pressure, since the distances between the central position of the C1 region and the D1 region and the three nearest photo spacers are different, the three nearest photo spacers are experienced a pressure imbalance. When the A1 region or the B1 region of the display panel 100 is extruded by the external pressure, since the distances between the central position of the A1 region and the B1 region and the three nearest photo spacers are similar, the pressure borne by the three nearest photo spacers may be uniformly dispersed.

Thus, the conventional repeating unit formed by the photo spacers arranged in a parallelogram or an irregular polygon cannot reasonably disperse the external pressure, and the pressure resistance of the display panel is reduced. In addition, due to the unreasonable photo spacer design, when the liquid crystal display panel is extruded by the external pressure, the deformation amount at the extrusion position may cause the inclination angle of the liquid crystal molecules greatly changed and the mura effect may be generated.

For resolving the problems of the conventional distribution structure of the photo spacers, the present disclosure provides a display panel and a display device. The display panel includes a first substrate, a second substrate located opposite to the first substrate, and a plurality of first photo spacers located between the first substrate and the second substrate. At least three of the first photo spacers define a repeating unit, the repeating unit comprises a first repeating unit arranged in a first shape, and the first shape comprises a regular polygon or a circle. The display panel improves the pressure resistance of the display panel, and prevents the mura effect.

In the disclosed embodiments, the display panel includes the photo spacers repeatedly arranged in a regular polygon or a circle. When the display panel is pressed by the external pressure at any position, the external pressure may be more uniformly dispersed between adjacent photo spacers, and thus improve the pressure resistance of the display panel. The pressure resistance of the display panel may be improved and the mura effect may be prevented. In addition, more photo spacers arranged in a regular polygon or a circle may be formed in the first repeating units, and thus the external pressure can be further dispersed and the pressure resistance of the display panel can be further improved.

Figure 2:
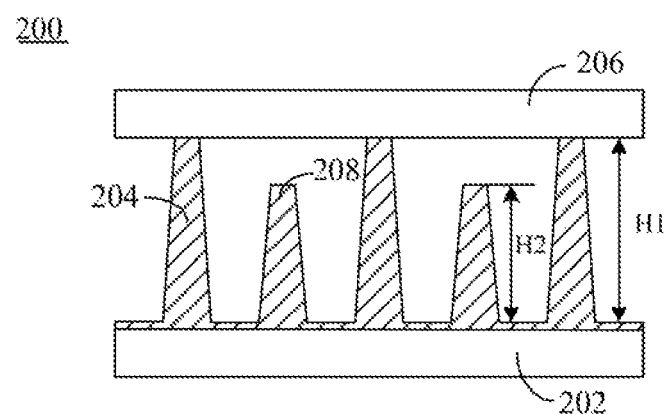
FIG. 2 illustrates a cross-sectional view of an exemplary display panel consistent with disclosed embodiments.

FIG. 2 illustrates a cross-sectional view of an exemplary display panel consistent with disclosed embodiments. As shown in FIG. 2, the display panel 200 includes a first substrate 202, a second substrate 206 located opposite to the first substrate 202, and a plurality of first photo spacers 204 located between the first substrate 202 and the second substrate 206. The photo spacers 204 may be located on either the first substrate 202 or the second substrate 206. In the embodiments shown in FIG. 2, the photo spacers 204 is located on the first substrate 202. However, the position of the photo spacers 204 is not limited in this disclosure.

Figure 3A:
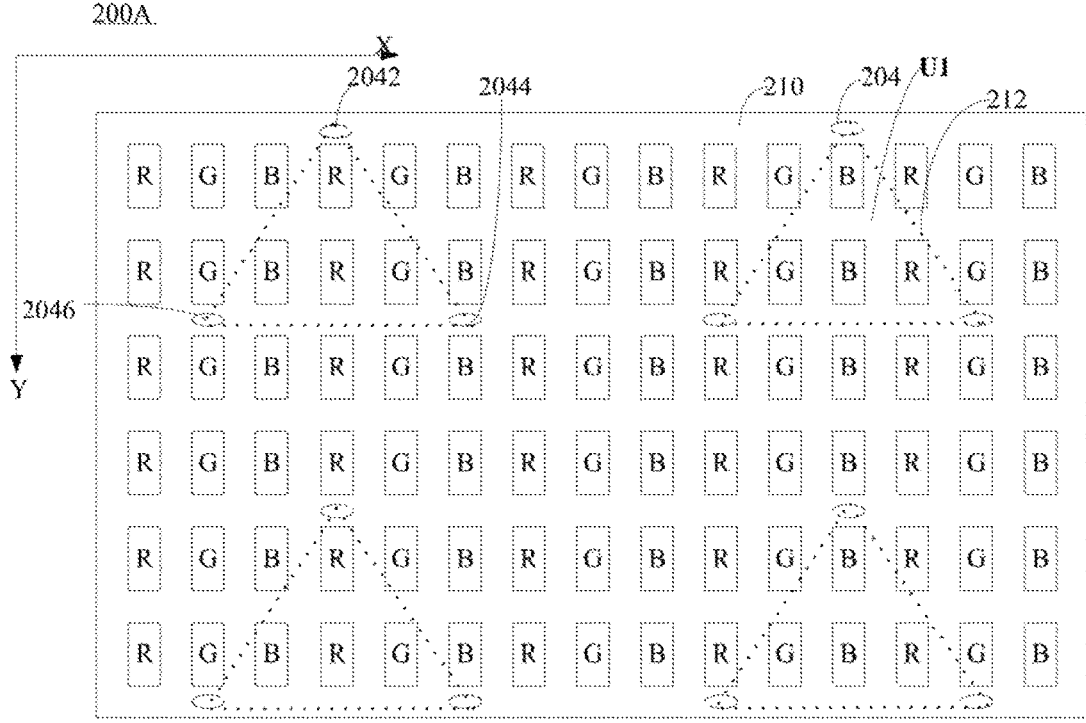
FIGS. 3A-3D illustrate distribution structures of first photo spacers in an exemplary display panel consistent with disclosed embodiments.

FIGS. 3A-3D illustrate distribution structures of first photo spacers 204 in an exemplary display panel consistent with disclosed embodiments. As shown in FIG. 3A, the display panel 200A includes a plurality of red sub-pixels (R), green sub-pixels (G) and blue sub-pixels (B), and the sub-pixels may be strip-shaped and arranged in a matrix form along the row and column directions. The colors of the sub-pixels are not limited in the disclosed embodiments, and the display panel may include additional sub-pixels with other colors, or substitute the R/G/B sub-pixels with other colors. In other embodiments, the sub-pixels may be arranged in other forms. The arrangement of the sub-pixels is not limited to those disclosed in the embodiments or drawings, and other arrangement of sub-pixels in the conventional display panels may be also applied to this disclosure. In addition, the gaps between sub-pixels may be filled with black matrix 210, but the filling of the gaps is not limited to the black matrix in this disclosure.

As shown in FIG. 3A, a plurality (at least three) of first photo spacers 204 may be arranged orderly or periodically along the row direction (X) and the column direction (Y), and be spaced apart from each other by a predetermined lateral and longitudinal distances to form a plurality of repeating unit 212 arranged regularly. In the disclosed embodiments, the first photo spacers 204 are suitably located in the black matrix 210. Each repeating unit 212 may include a first repeating unit U1 formed in a first shape and arranged repeatedly. FIG. 3 illustratively shows four first repeating units U1, however the amount of the first repeating units U1 is not limited in this disclosure and may be changed as required.

In the disclosed embodiments, the first repeating unit U1 formed by the first photo spacers 204 may have the first shape. For example, as shown in FIG. 3A, the first shape may be a regular triangle having the vertexes formed by three first photo spacers 204. The amount of first photo spacers 204 is not limited in this disclosure and may be changed as required. The amount of first photo spacers 204 to form the regular triangle may be any value greater than three.

In the first repeating unit U1 formed by the first photo spacers 204 arranged in the regular triangle, when the external pressure is applied to the display panel 200A, the distances between the central position of the first repeating unit U1 arranged in the regular triangle and the adjacent first photo spacers 204 are the same. For example, in FIG. 3A, the central position of the first repeating unit U1 at upper-left corner has the same distance to the adjacent three first photo spacers 2042, 2044 and 2046. The external pressure may be more evenly distributed to the adjacent three first photo spacers 204. Comparing to the distribution structure of the conventional display panels, the first repeating unit U1 arranged in the regular triangle has more uniform pressure bearing balance, and the pressure resistance of the display panel may be thus improved and the mura effect of the display panel may be thus prevented.

Figure 3B:
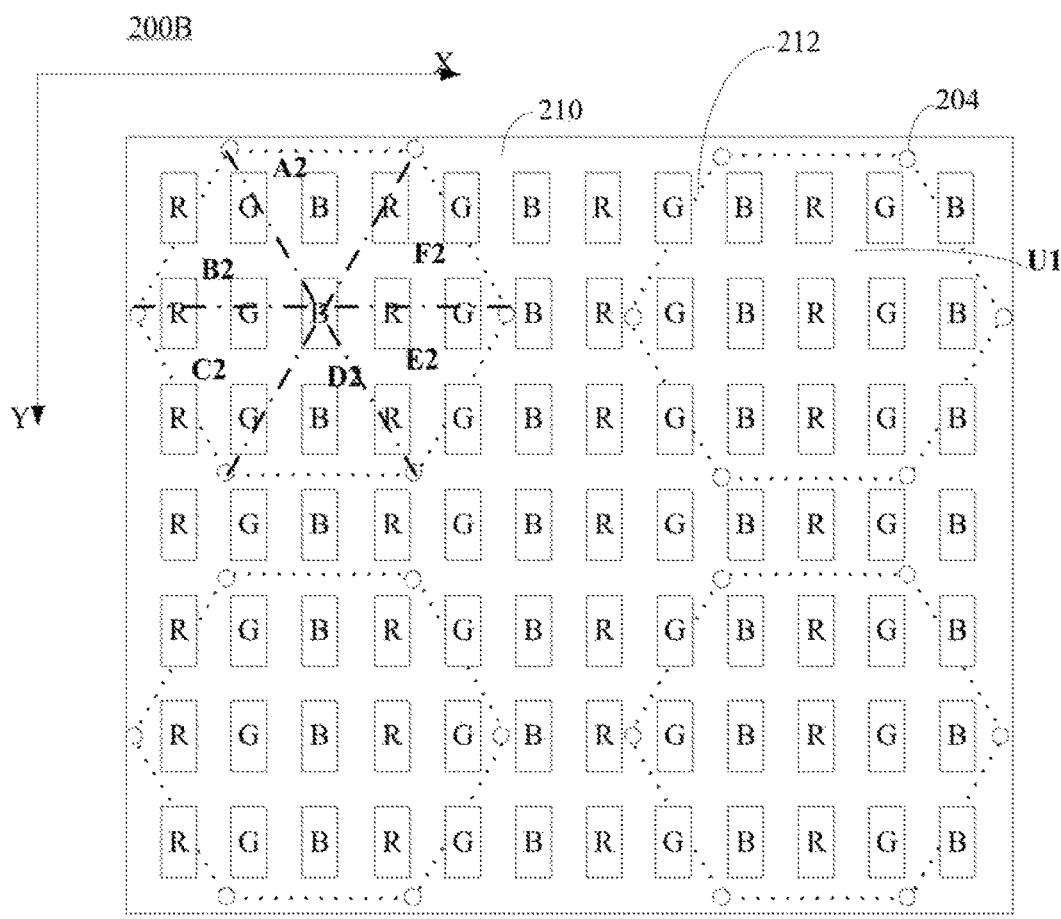

In the disclosed embodiments, as shown in FIG. 3B, the display panel 200B may have the first repeating unit U1 formed by the first photo spacers 204 arranged in the first shape. The first shape may be, for example, a regular hexagon with six first photo spacers 204 as vertexes. The amount of first photo spacers 204 is not limited in this disclosure and may be changed as required. The amount of first photo spacers 204 to form the regular hexagon may be any value greater than six.

In the first repeating unit U1 formed by the first photo spacers 204 arranged in the regular hexagon, when the external pressure is applied to the display panel 200B, the distances between the central position of the first repeating unit U1 arranged in the regular hexagon and the center position of each divided block and the adjacent first photo spacers 204 are the same. For example, as shown in FIG. 3B, the first repeating unit U1 is divided into six blocks A2-F2. The distances between the central position of each block and two nearest photo spacers 204 are the same, and thus the external pressure may be evenly distributed to two nearest photo spacers 204. Comparing to the distribution structure of the conventional display panels, the first repeating unit U1 arranged in the regular hexagon has more uniform pressure bearing balance, and the pressure resistance of the display panel may be thus improved and the mura effect of the display panel may be thus prevented.

Figure 3C:
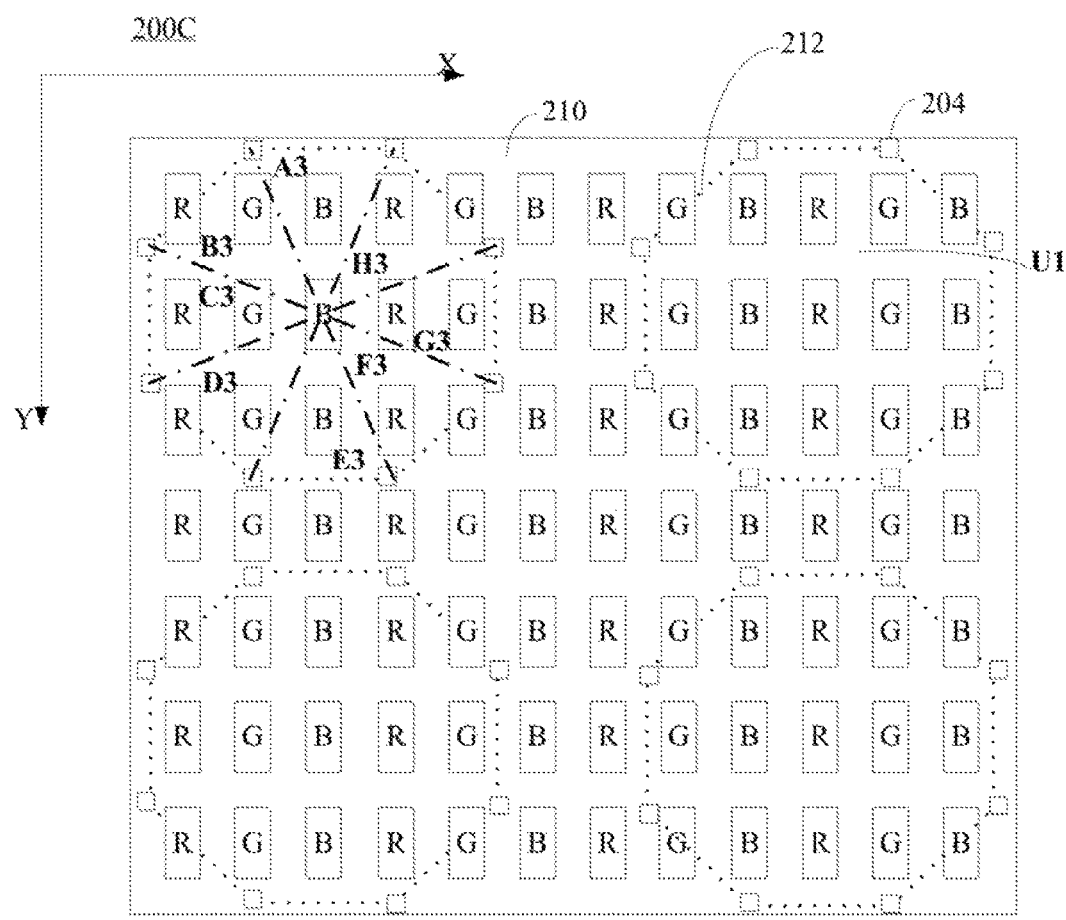

In the disclosed embodiments, as shown in FIG. 3C, the display panel 200C may have the first repeating unit U1 formed by the first photo spacers 204 arranged in the first shape. The first shape may be, for example, a regular octagon with eight first photo spacers 204 as vertexes. The amount of first photo spacers 204 is not limited in this disclosure and may be changed as required. The amount of first photo spacers 204 to form the regular octagon may be any value greater than eight.

In the first repeating unit U1 formed by the first photo spacers 204 arranged in the regular octagon, when the external pressure is applied to the display panel 200C, the distances between the central position of the first repeating unit U1 arranged in the regular octagon and the center position of each divided block and the adjacent first photo spacers 204 are the same. For example, as shown in FIG. 3C, the first repeating unit U1 is divided into eight blocks A3-H3. The distances between the central position of each block and two nearest photo spacers 204 are the same, and thus the external pressure may be evenly distributed to two nearest photo spacers 204. Comparing to the distribution structure of the conventional display panels, the first repeating unit U1 arranged in the regular octagon has more uniform pressure bearing balance, and the pressure resistance of the display panel may be thus improved and the mura effect of the display panel may be thus prevented.

It should be noted that, FIGS. 3A-3C illustratively show that the first repeating unit may be arranged in a regular triangle, a regular hexagon, or a regular octagon. However, the shape of the first repeating unit is not limited in this disclosure, and the shape of the first repeating unit may be any regular polygon as required.

Figure 3D:
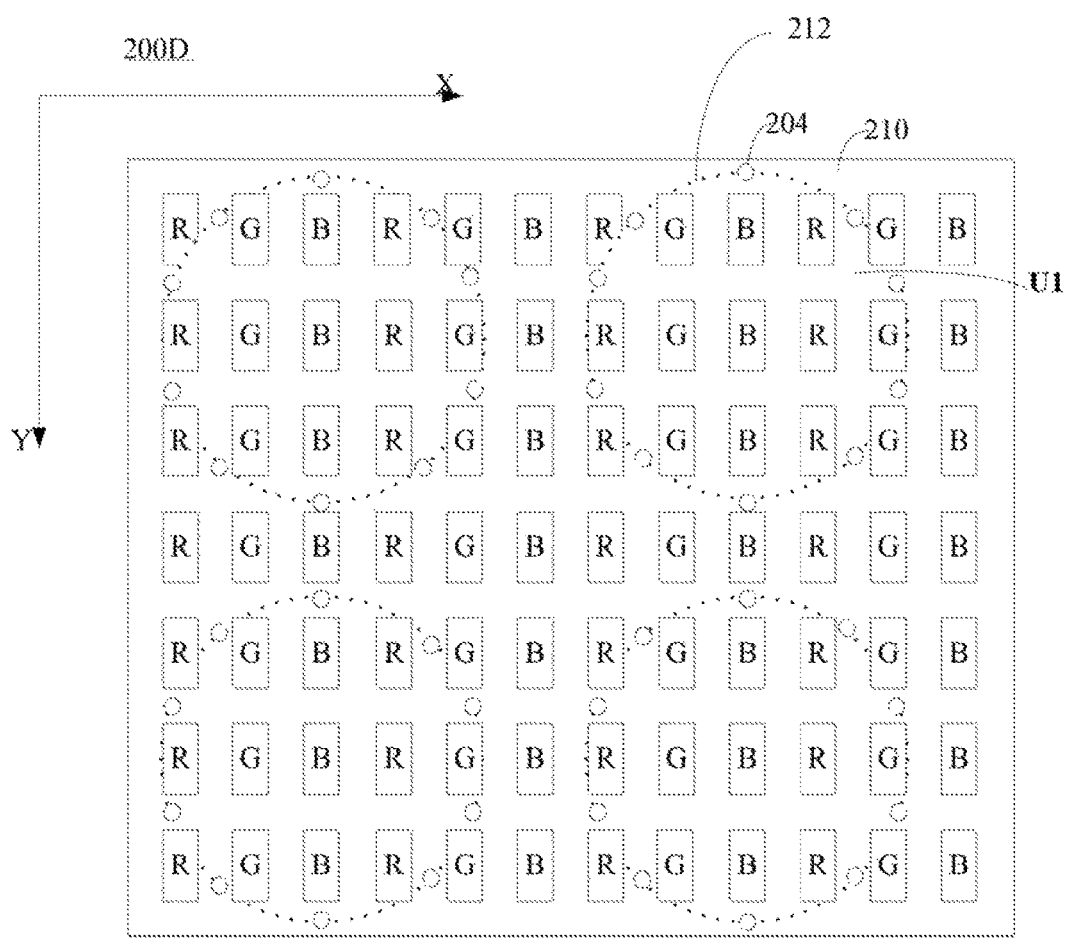

In the disclosed embodiments, as shown in FIG. 3D, the display panel 200D may have the first repeating unit U1 formed by the first photo spacers 204 arranged in the first shape. The first shape may be, for example, a circle with ten first photo spacers 204 as vertexes. The amount of first photo spacers 204 is not limited in this disclosure and may be changed as required. The amount of first photo spacers 204 to form the circle may be any value greater than four.

In the first repeating unit U1 formed by the first photo spacers 204 arranged in the circle, when the external pressure is applied to the display panel 200D, the distances between the central position of the first repeating unit U1 arranged in the circle and the adjacent first photo spacers 204 are the same. The external pressure may be evenly distributed to two nearest photo spacers 204. Comparing to the distribution structures of the conventional display panels, the first repeating unit U1 arranged in the circle has more uniform pressure bearing balance, and the pressure resistance of the display panel may be thus improved and the mura effect of the display panel may be thus prevented.

In the disclosed embodiments, the display panel includes the first repeating unit formed by the first photo spacers regularly and repeatedly arranged in a regular polygon or a circle. The distances between the central position of the first repeating unit and/or each block and the adjacent first photo spacers 204 are the same. When the external pressure is applied to the display panel, the external pressure may be evenly distributed to the adjacent first photo spacers, and the pressure resistance of the display panel may be thus improved and the mura effect of the display panel may be thus prevented.

The display panel disclosed by the above embodiments provides the basic concept and the primary features of the disclosure, and the pressure resistance of the display panel is obviously improved. However, the present disclosure is not limited thereto. Furthermore, the disclosed embodiments provide another display panel. In the disclosed embodiments, more first photo spacers arranged in the regular polygon or the circle may be located in the first repeating unit. Thus, the external pressure may be further dispersed, and the pressure resistance of the display panel may be further improved and the mura effect of the display panel may be further prevented. The detailed embodiments are described below in conjunction with FIGS. 4A-4F.

Figure 4A:
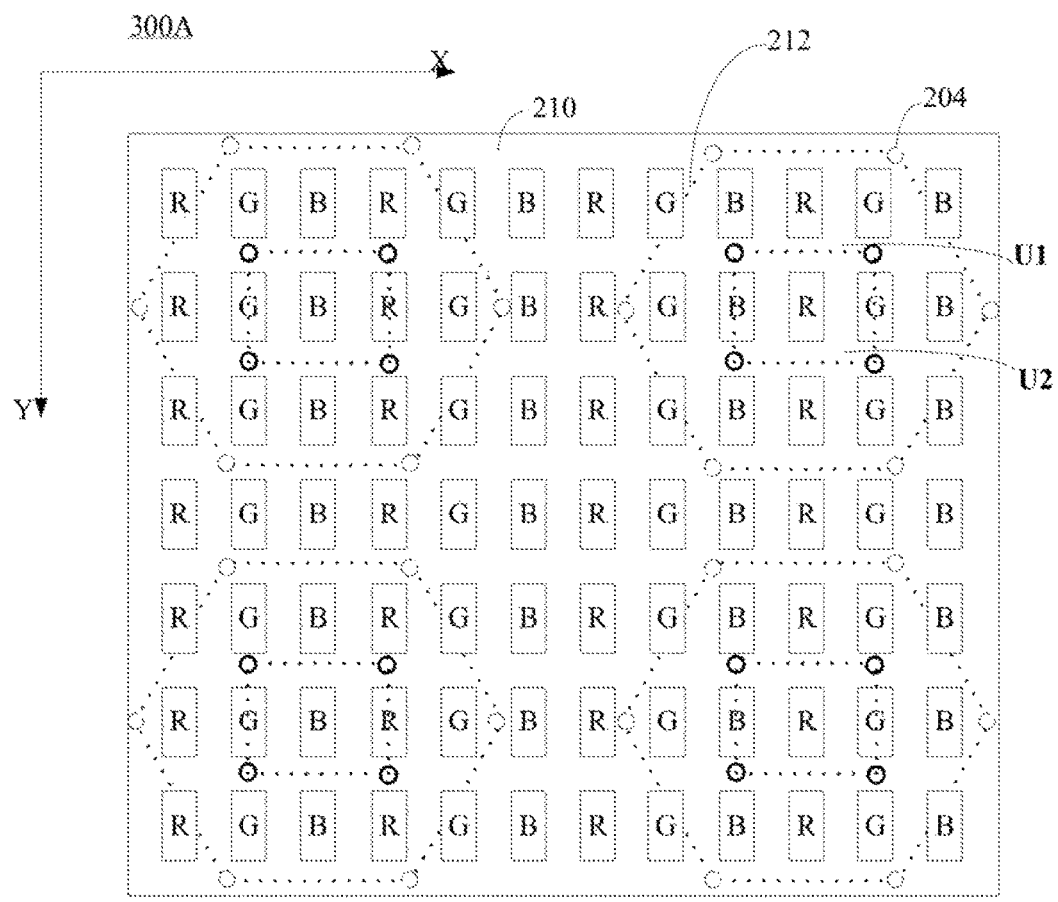
FIGS. 4A-4F illustrate schematic diagrams of the related position of an exemplary first repeating unit and second repeating unit consistent with disclosed embodiments.
Figure 4B:
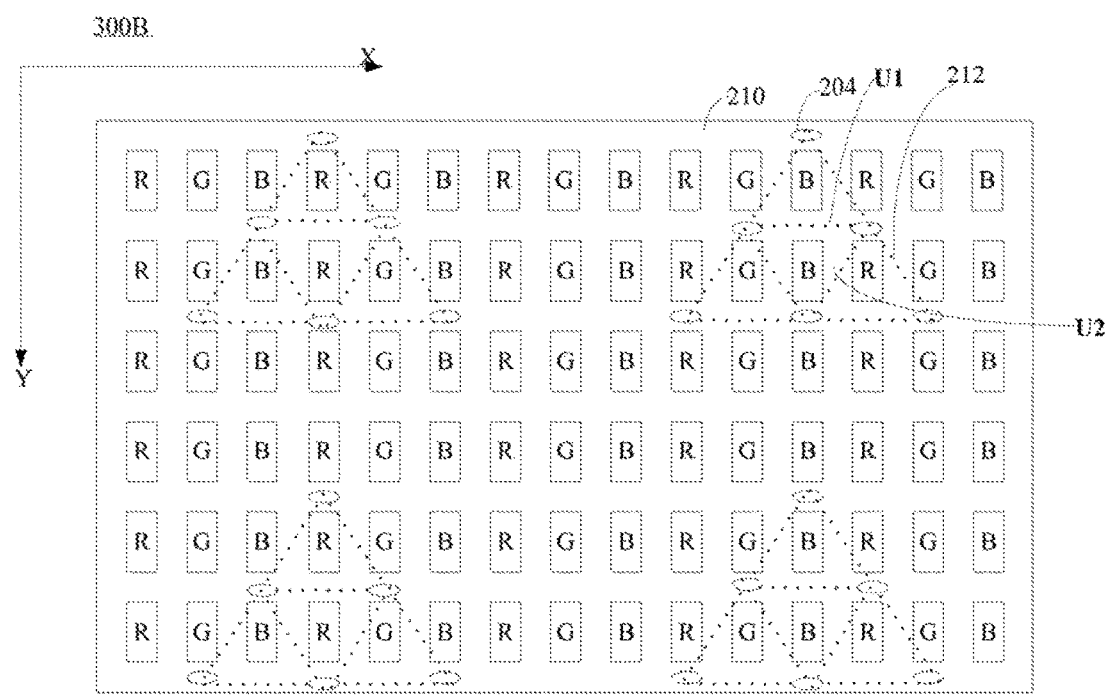
Figure 4C:
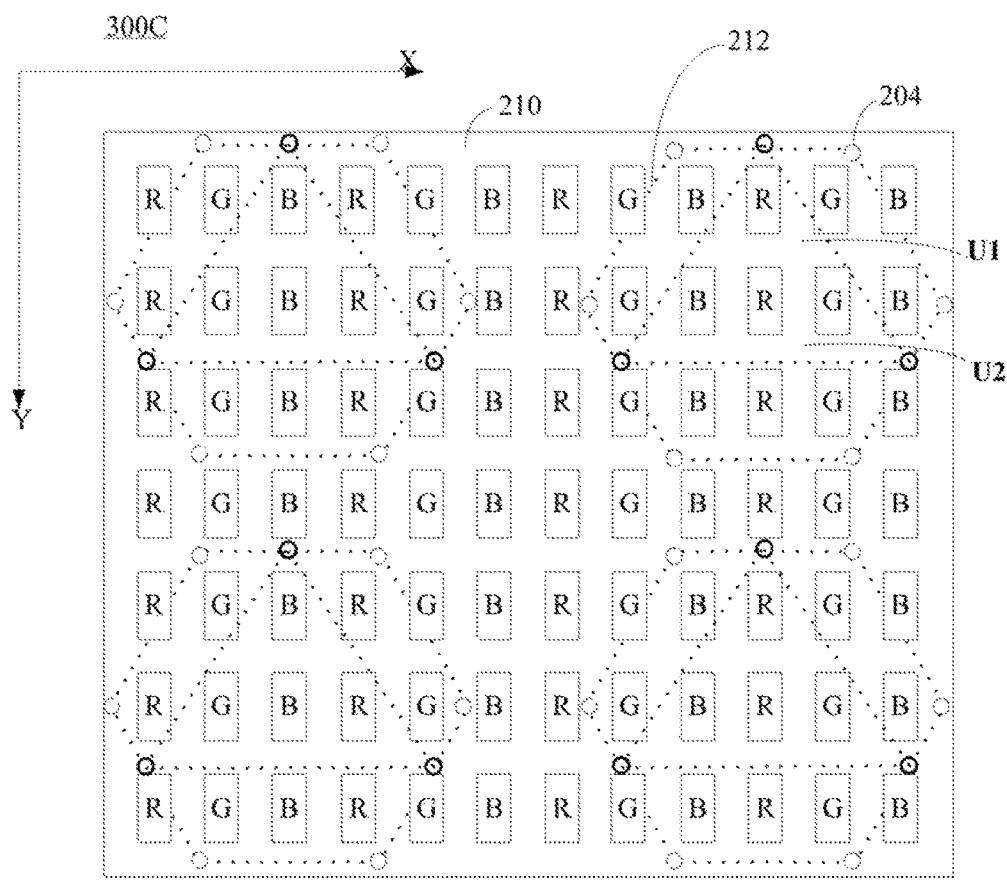
Figure 4D:
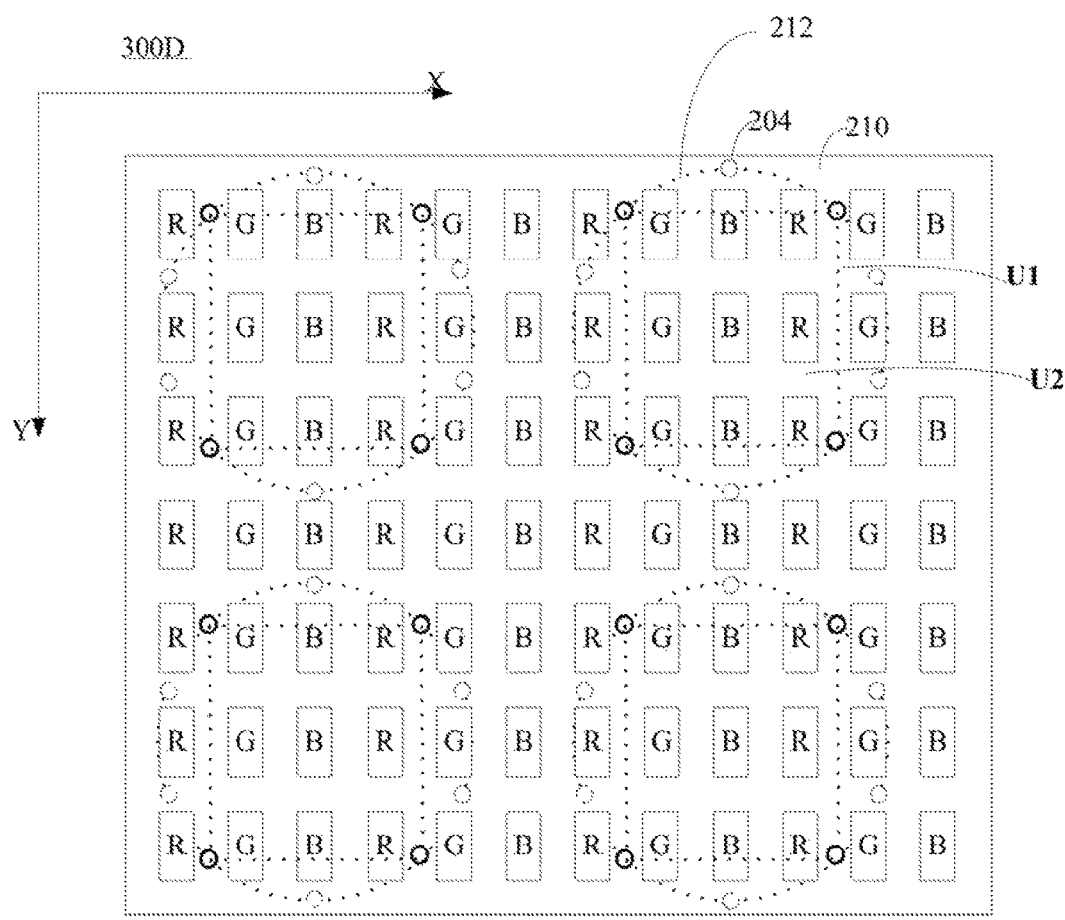
Figure 4E:
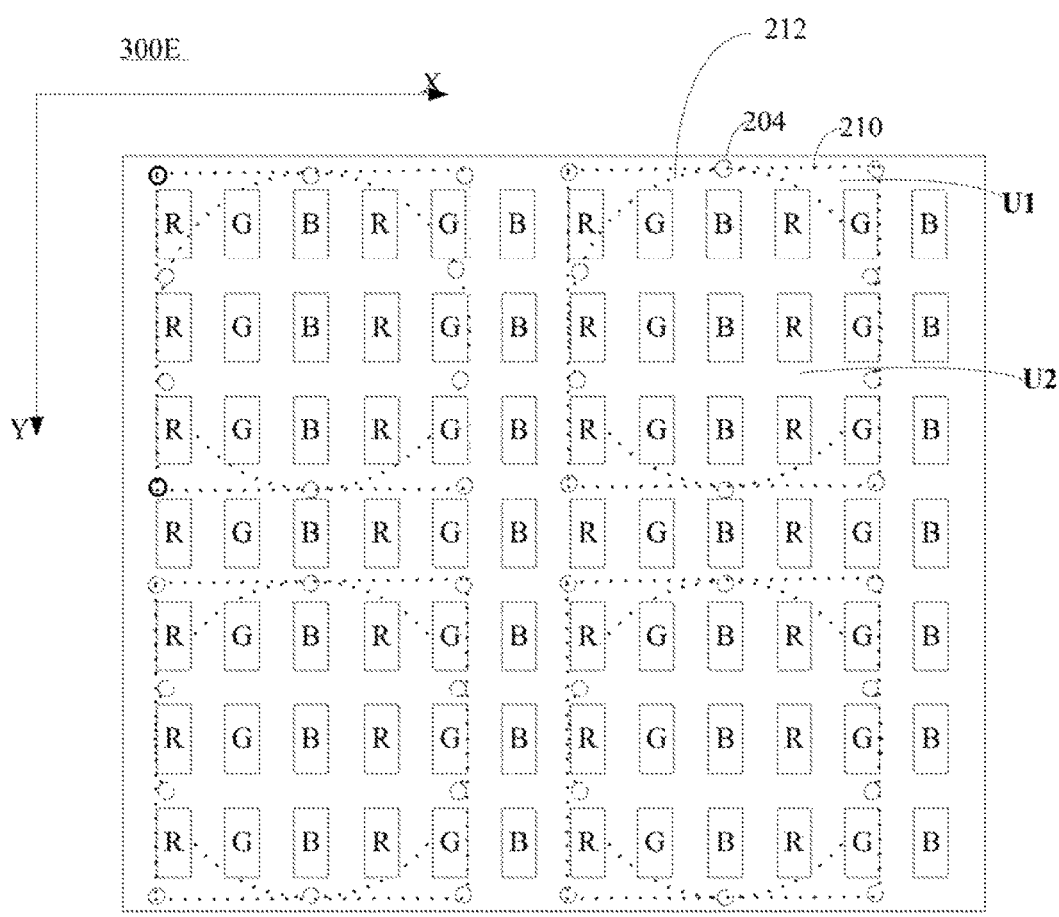
Figure 4F:
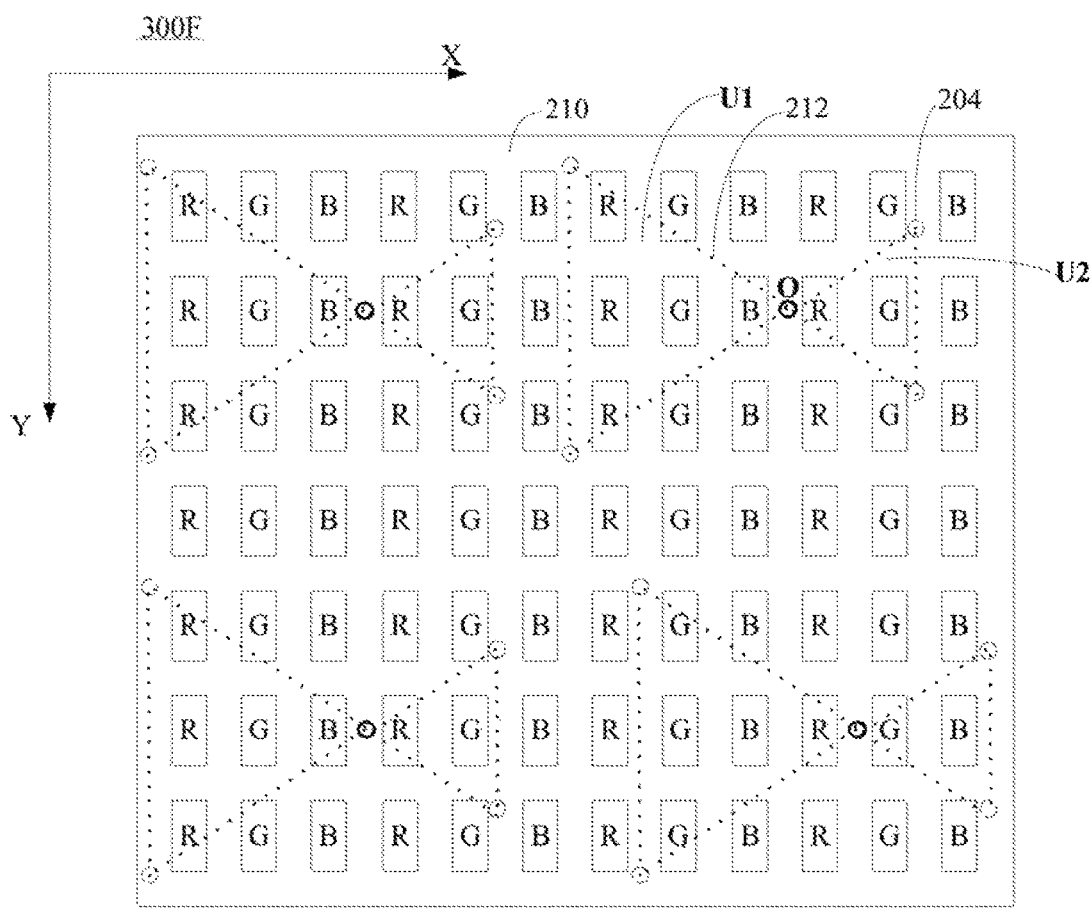

FIGS. 4A-4F illustrate schematic diagrams of the related position of an exemplary first repeating unit and an exemplary second repeating unit consistent with disclosed embodiments. The difference between the display panels 300A-300F shown in FIGS. 4A-4F and the display panels 200A-200D shown in FIGS. 3A-3D is that the repeating unit 212 of the display panels 300A-300F may further include the second repeating unit U2 repeatedly arranged in the second shape. The second shape may be a regular polygon or a circle, for example, a square as shown in FIGS. 4A and 4D, a regular triangle as shown in FIGS. 4B, 4C and 4F, and a circle as shown in FIG. 4E. In addition, the second shape may be other regular polygon, for example, the regular hexagon or the regular octagon.

In the disclosed embodiments, as shown in FIG. 4A, the display panel 300A may have the second repeating unit U2 located in the first repeating unit U1 and at a central region of the first repeating unit U1. For example, the repeating unit U2 formed by four first photo spacers 204 arranged in the square is located at the central region of the first repeating unit U1 formed by six first photo spacers 204 arranged in the regular hexagon. In this way, it may be avoided that the central region of the first repeating unit U1 is not supported by the first photo spacers, and the large deformation amount is thus caused by large local bearing pressure of the display panel. The pressure resistance of the display panel is further improved, and the mura effect of the display panel is further prevented.

In the disclosed embodiments, as shown in FIG. 4B, in the display panel 300B, a center of the first repeating unit U1 may coincide with a center of the second repeating unit U2. For example, the second repeating unit U2 formed by three first photo spacers 204 arranged in the regular triangle is located in the first repeating unit U1 formed by three first photo spacers 204 arranged in the regular triangle, and the center of the first repeating unit U1 coincides the center of the second repeating unit U2. Due to the improved distribution density of the first photo spacers, the pressure resistance of the repeating unit 212 on the external pressure may be further improved. Moreover, since the second repeating unit is also arranged in the regular polygon or the circle, the external pressure may be more evenly distributed to the adjacent first photo spacers. The pressure resistance of the display panel is further improved, and the mura effect of the display panel is further prevented.

In the disclosed embodiments, as shown in FIG. 4C, the display panel 300C may have the second repeating unit U2 inscribing the first repeating unit U1. For example, the vertexes of the second repeating unit U2 formed by three first photo spacers 204 arranged in the regular triangle individually inscribe three lines of the first repeating unit U1 formed by six first photo spacers 204 arranged in the regular hexagon.

In the disclosed embodiments, as shown in FIG. 4D, four vertexes of the second repeating unit U2 formed by four first photo spacers 204 arranged in the square individually inscribe the first repeating unit U1 formed by six first photo spacers 204 arranged in the circle. Similarly, due to the improved distribution density of the first photo spacers, the pressure resistance of the repeating unit 212 on external pressure may be further improved. Moreover, since the second repeating unit is also arranged in the regular polygon or the circle, the external pressure may be more evenly distributed to the adjacent first photo spacers. The pressure resistance of the display panel is further improved, and the mura effect of the display panel is further prevented.

In the disclosed embodiments, as shown in FIG. 4E, the display panel 300E may have the second repeating unit U2 inscribing the first repeating unit U1. For example, the second repeating unit U2 formed by six first photo spacers 204 arranged in the circle inscribes the first repeating unit U1 formed by four first photo spacers 204 arranged in the square. Similarly, due to the improved distribution density of the first photo spacers, the pressure resistance of the repeating unit 212 on external pressure may be further improved. Moreover, since the second repeating unit is also arranged in the regular polygon or the circle, the external pressure may be more evenly distributed to the adjacent first photo spacers. The pressure resistance of the display panel is further improved, and the mura effect of the display panel is further prevented.

In the disclosed embodiments, as shown in FIG. 4F, the display panel 300F may have the second repeating unit U2 located outside the first repeating unit U1, and the first repeating unit U1 connects to at least one point of the second repeating unit U2. For example, the second repeating unit U2 formed by three first photo spacers 204 arranged in the regular triangle connects the first repeating unit U1 formed by three first photo spacers 204 arranged in the regular triangle at the point O. In other words, the first repeating unit U1 and the second repeating unit U2 share the same photo spacer. In the disclosed embodiments, the area of the second repeating unit U2 is smaller than the area of the first repeating unit U1. In other words, the first repeating unit U1 is a larger regular triangle, and the second repeating unit U2 is a smaller regular triangle.

It should be noted that the shapes of the first repeating unit U1 and the second repeating unit U2 are not limited to the regular triangle, and the connecting point is not limited to one point. For example, the second repeating unit U2 and the first repeating unit U1 may be both arranged in the circle. Two circles may connect each other at the same photo spacer. The first repeating unit U1 may be a circle having larger area and the repeating unit U2 may be a circle having smaller area. In this way, the first and second repeat units are connected by sharing at least a portion of the first photo spacers. The manufacturing process of the first photo spacers may be reduced, and the production cost and time are thus also reduced. Moreover, since the second repeating unit is also arrange in the regular polygon or the circle, the external pressure may be more evenly distributed to the adjacent first photo spacers. The pressure resistance of the display panel is further improved, and the mura effect of the display panel is further prevented.

It should be noted that the related position and shapes of the first repeating unit U1 and the second repeating unit U2 and the amount of the first photo spacers are not limited in this disclosure. The repeating unit 212 formed by combining the first repeating unit U1 and the second repeating unit U2 may be the combination of any regular polygon or circle with another regular polygon or circle. That is, two (e.g., the first repeating unit U1 and the second repeating unit U2) or more repeating units may be combined to form a complex repeating unit. In addition, the second repeating unit U2 may be located in the first repeating unit U1, the second repeating unit U2 may be located at the central region of the first repeating unit U1, the second repeating unit U2 may inscribe the first repeating unit U1, and the second repeating unit U2 may be located outside the first repeating unit U1 and connects to at least one point of the first repeating unit U1. The disclosure is not limited to the above embodiments, and any combination and deformation may be performed on the embodiments described above are within the scope of the present disclosure.

It should be noted that the relationship between the first repeating unit and the second repeating unit may be applied singly or combined with two or more designs simultaneously as required.

In addition, each repeating unit 212 in the display panels 300A-300E shown in FIGS. 4A-4E may further include more repeating units repeatedly arranged in the regular polygon or the circle. For example, a third repeating unit (not shown) may be located in the second repeating unit U2, a fourth repeating unit (not shown) may be located in the third repeating unit, and so on. Each repeating unit 212 in the display panel 300F shown in FIG. 4F may further include more repeating units repeatedly arranged in the regular polygon or the circle. For example, the third repeating unit may be located outside the second repeating unit U2 and connects to at least one point of the second repeating unit U2, the fourth repeating unit may be located outside the third repeating unit and connects to at least one point of the third repeating unit, and so on.

In the disclosed embodiments, in order to better enable the photo spacers in the first repeating unit having a uniform pressure resistance, the display panel further includes the second repeating units formed by more first photo spacers in the first repeating units. The second repeating unit is also arranged in a regular polygon or a circle. In this way, on the one hand, the distribution density of the first photo spacers between the sub-pixels is increased and the external pressure can be better borne. When the display panel is subjected to a larger external pressure, the display panel may recover faster and a larger shape variable may not be generated. On the other hand, the distances between the central position of the second repeating unit and the adjacent first photo spacers are the same, and/or the distances between the central position of each block divided in the second repeating unit and the adjacent first photo spacers are the same. Thus, the first and second repeating units may uniformly bear the external pressure, and the pressure resistance of the display panel is further improved and the mura effect of the display panel is further prevented.

Figure 5:
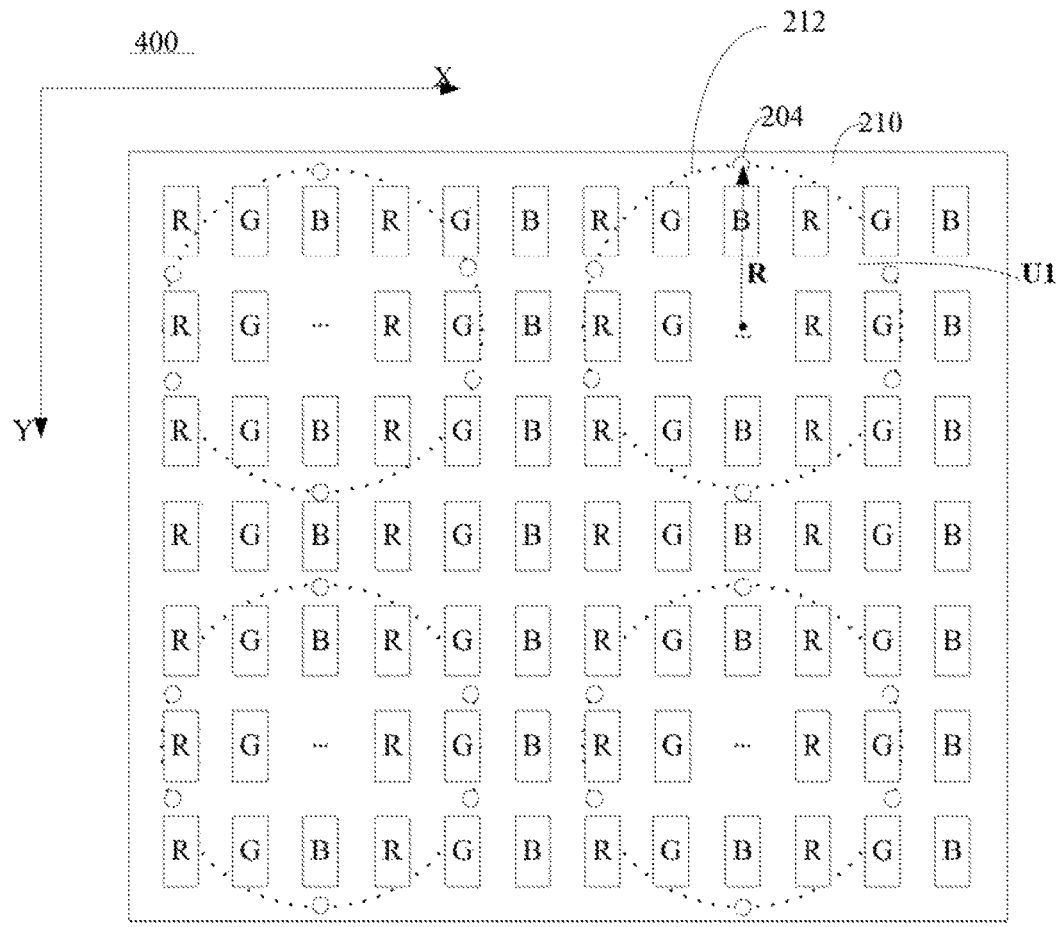
FIG. 5 illustrates a schematic diagram of the related position of an exemplary first photo spacer and sub-pixels consistent with disclosed embodiments.

FIG. 5 illustrates a schematic diagram of the related position of an exemplary first photo spacer and the sub-pixels consistent with disclosed embodiments. As shown in FIG. 5, the first shape, fir example, a circle, formed by the first repeating unit U1 has a radius R, and the range of R is approximately 30 μm-70 μm. When the first shape is a polygon, R may be the distance from the central point to each vertex.

In the disclosed embodiments, the first shape formed by the first repeating unit U1 has a radius R approximately 30 μm-70 μm. In other words, each repeating unit U1 may approximately cover 60-2100 sub-pixels. As shown in FIGS. 4A-4E, each repeating unit includes the first repeating unit U1 arranged in the first shape and the second repeating unit U2 arranged in the second shape. The amount of the sub-pixels located in each second repeating unit U2 is not limited in this disclosure. Because the second repeating unit U2 is located in the first repeating unit U1, the amount of the sub-pixels located in each second repeating unit U2 is generally less than the amount of the sub-pixels located in each first repeating unit U1.

In the disclosed embodiments, when the radius range or the amount of the sub-pixels covered by the first repeating unit is applied, the first repeating units may ensure a better pressure bearing balance, and the pressure resistance of the display panel is further improved. On the other hand, the complexity, the production time and the cost of the display panel manufacturing process are not obviously increased. When the radius of the first shape is larger than the radius range, the pressure resistance of the display panel may not be ensured. When the radius of the first shape is less than the radius range, the complexity, the production time and the cost of the display panel manufacturing process may be obviously increased but the pressure resistance of the display panel may not be significantly enhanced. The radius range is not limited in this disclosure, the area of the first shape covered by the first repeating unit U1 formed by the first photo spacers may be generally changed according to different Pixels Per Inch (PPI).

In the disclosed embodiments, the first shape of the first repeating unit U1 and the second shape of the second repeating unit U2 may be the same. For example, as shown in FIGS. 4B and 4F, the first shape of the first repeating unit U1 is the regular triangle, and the second shape of the second repeating unit U2 is the regular triangle as well. However, the first and second shapes are not limited to the regular triangle. For example, the first shape of the first repeating unit U1 and the second shape of the second repeating unit U2 may be a square, a regular hexagon, a regular octagon or other regular polygon, and also may be a circle.

In the disclosed embodiments, the first shape of the first repeating unit U1 and the second shape of the second repeating unit U2 may be different. For example, as shown in FIG. 4A, the first shape of the first repeating unit U1 is a regular hexagon, and the second shape of the second repeating unit U2 is a square. In another example, as shown in FIG. 4C, the first shape of the first repeating unit U1 is a regular hexagon, and the second shape of the second repeating unit U2 is a regular triangle. In a further example, as shown in FIG. 4D, the first shape of the first repeating unit U1 is a circle, and the second shape of the second repeating unit U2 is a square. In a further example, as shown in FIG. 4E, the first shape of the first repeating unit U1 is a square, and the second shape of the second repeating unit U2 is a circle. The shapes are not limited in this disclosure, and the shapes of the first repeating unit U1 and the second repeating unit U2 may be the combination of other polygon or circle.

Returning to FIGS. 3A and 4B, the cross-sectional shape of the first photo spacer 204 may be an oval. The cross-sectional shape of the first photo spacer is not limited in this disclosure. For example, the cross-sectional shape of the first photo spacer 204 may be a square as shown in FIG. 3C, or a circle as shown in FIGS. 3B, 3D, 4A, 4C, 4D and 4E.

Returning to FIG. 2, the first substrate 202 may be the array substrate of the display panel 200. The first photo spacer 204 may be located on the array substrate.

The array substrate may be provided with a scanning line for providing a scanning signal and a data line (not shown) for providing a gray-level signal for the display panel 200. The array substrate may further be provided with a plurality of thin film transistors (TFT) (not shown) electrically connected to the scanning lines and the data lines. The thin film transistors may be used to control the on/off state of the pixel units on the display panel 200. The array substrate may also have a pixel electrode and/or a common electrode (not shown) for receiving a voltage signal to drive the liquid crystal molecules to rotate.

Figure 6:
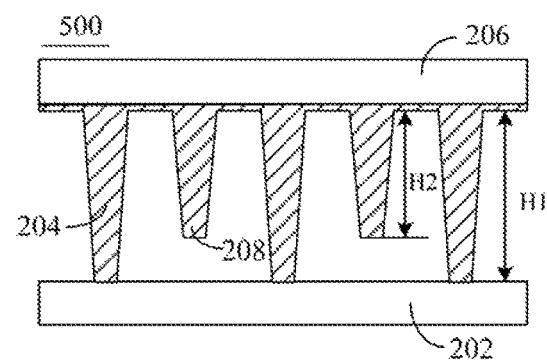
FIG. 6 illustrates a cross-sectional view of another exemplary display panel consistent with disclosed embodiments.

FIG. 6 illustrates a cross-sectional view of another exemplary display panel consistent with disclosed embodiments. As shown in FIG. 6, the display panel 500 includes the first substrate 202 and the second substrate 206. The second substrate 206 may be the color film substrate of the display panel 500. The first photo spacer 204 may be located on the color film substrate.

The color film substrate may include the color filter and the black matrix. The color filter may include a plurality of color resistors, and each color resistor may correspond to the pixel unit on the first substrate 202 in a one-to-one correspondence manner. The color resistors may include red resistors (R), green resistors (G) and blue resistors (B). The colors of the color resistors are not limited in the disclosure. For example, the color resistors may include red resistors (R), green resistors (G), blue resistors (B) and white resistors (W). In another example, the color resistors may include red resistors (R), green resistors (G), blue resistors (B) and yellow resistors (Y). The black matrix may divide the color resistors, and may cover the scanning lines, the data lines and the thin film transistors on the first substrate 202 along a direction perpendicular to the first substrate 202.

As shown in FIGS. 2 and 6, the display panel may further include the second photo spacers 208. The second photo spacers 208 may be located between the first substrate 202 and the second substrate 206, and the height H2 of the second photo spacers may be lower than the height H1 of the first photo spacers.

Figure 7:
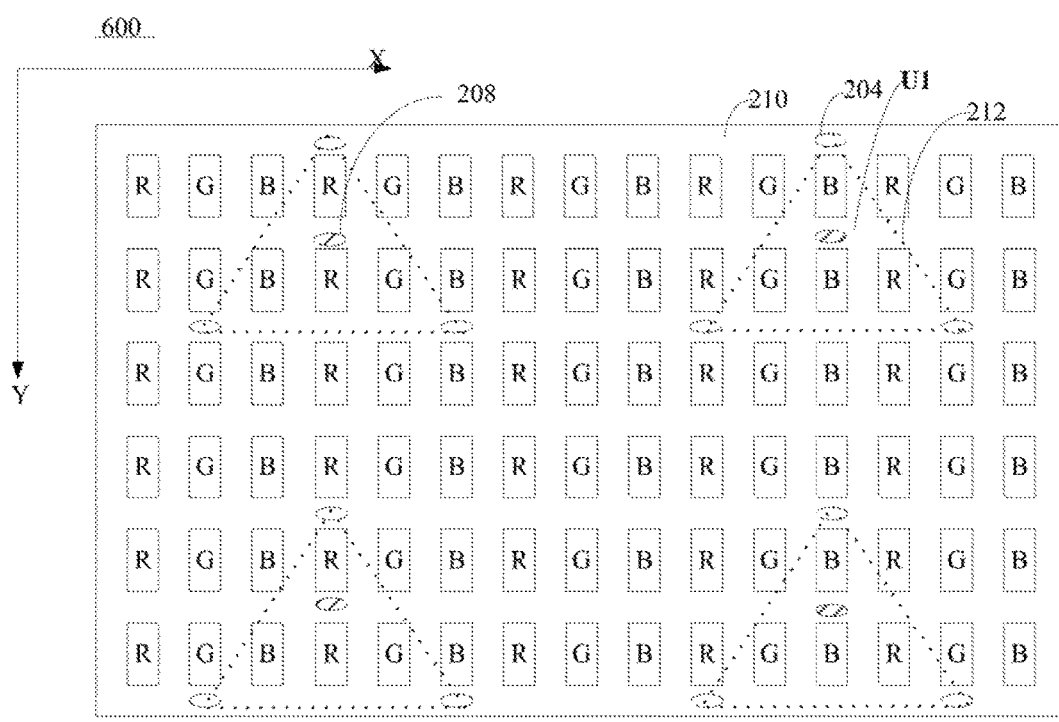
FIG. 7 illustrates a schematic diagram of the related position of an exemplary first photo spacer and second photo spacer consistent with disclosed embodiments.

FIG. 7 illustrates a schematic diagram of the related position of an exemplary first photo spacer and an exemplary second photo spacer consistent with disclosed embodiments. As shown in FIG. 7, each repeating unit 212 of the display panel 600 may further include at least one second photo spacer 208. The at least one second photo spacer 208 may be located at the central position of the first repeating unit U1. The location of the second photo spacer 208 is not limited in this disclosure, and the second photo spacer 208 may be located at any position in the first repeating unit U1 as required. In the disclosed embodiments, the amount of the second photo spacers 208 may be more or less than the amount of the first photo spacers 204. In another embodiment, a plurality of second photo spacers 208 may form a regularly arranged regular polygon or a circle. In another embodiment, the regular polygon or circle formed by the second photo spacers 208 may be located at the central region of the first repeating unit U1 and/or the second repeating unit U2, or may inscribe the first repeating unit U1 and/or the second repeating unit U2. Similarly, the cross-sectional shape of the second photo spacers 208 may be an oval, a circle or a square.

In a general case, the first photo spacers are sufficient to withstand the external pressure applied to the display panel. However, in some extreme cases, when the external pressure is too large, the first photo spacers may not have enough protection, and the deformation of the display panel may be too large and cannot be recovered in time. In order to prevent possible damage to the display panel, the second photo spacers having a height less than the first photo spacers may be added in the display panel. The second photo spacers may assist the first photo spacers to further bear and disperse the external pressure when the deformation of the display panel is too large.

In the disclosed embodiments, the first photo spacers 204 may be located between the sub-pixels having the same color. For example, as shown in FIG. 3A, the first photo spacers 204 is located between two sub-pixels R, located between two sub-pixels G, or located between two sub-pixels B. The location of the first photo spacers 204 is not limited in this disclosure. For example, as shown in FIG. 3B, the first photo spacers 204 may be located between two sub-pixels having any two colors. For example, the first photo spacers 204 may be located between a sub-pixel R and a sub-pixel G, located between a sub-pixel R and a sub-pixel B, or located between a sub-pixel G and a sub-pixel B. In the disclosed embodiments, in the same display panel, a portion of the first photo spacers 204 may be located between the sub-pixels having the same color, and another portion of the first photo spacers 204 may be located between the sub-pixels having two different colors, as shown in FIG. 3C.

Figure 8:
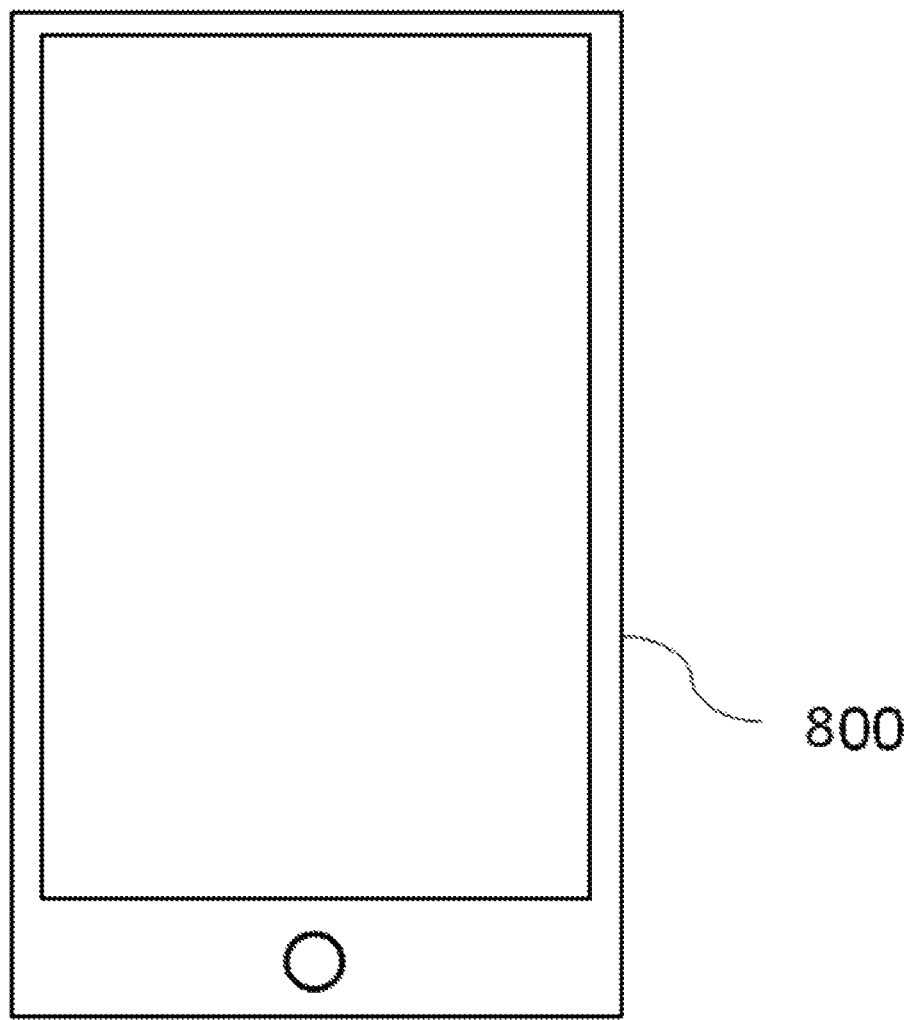
FIG. 8 illustrates a schematic diagram of an exemplary display device consistent with disclosed embodiments.

FIG. 8 illustrates a schematic diagram of an exemplary display device consistent with disclosed embodiments. As shown in FIG. 8, a display device 800 is provided in this disclosure. The display device 800 may include any display panel disclosed in the above embodiments, and thus the display device 800 may have the same beneficial effects as the display panels described above. The display device 800 may be applied to various terminal types, such as smart phones, tablet computers, Personal Digital Assistant (PDA), and so on. The application of the display device is not limited in this disclosure.

In the disclosed embodiments, the display device 800 uses a liquid crystal display as an example, and the liquid crystal display may include a liquid crystal display controller, a liquid crystal display panel, and a light emitting diode backlight source. It should be noted that the liquid crystal display is only one example of the display device 800, and the present disclosure is not limited thereto. Other types of display devices may be applied to the display panels in the disclosed embodiments, and the pressure resistance may be improved.

Figure 9:
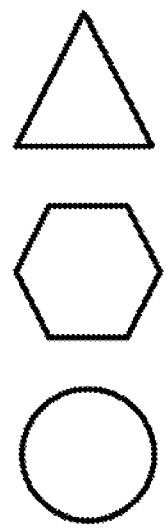
FIG. 9 illustrates distribution structures of an exemplary first repeating unit consistent with disclosed embodiments.

FIG. 9 illustrates distribution structures of an exemplary first repeating unit consistent with disclosed embodiments. In the disclosed embodiments, the repeating unit may be formed by only the first repeating unit formed by the first photo spacers arranged in the first shape. As shown in FIG. 9, for example, the first shape may be a regular triangle, a regular hexagon, or a circle. However, the shape of the first repeating unit is not limited in this disclosure, and the shape of the first repeating unit may be any regular polygon or circle as required.

Figure 10:
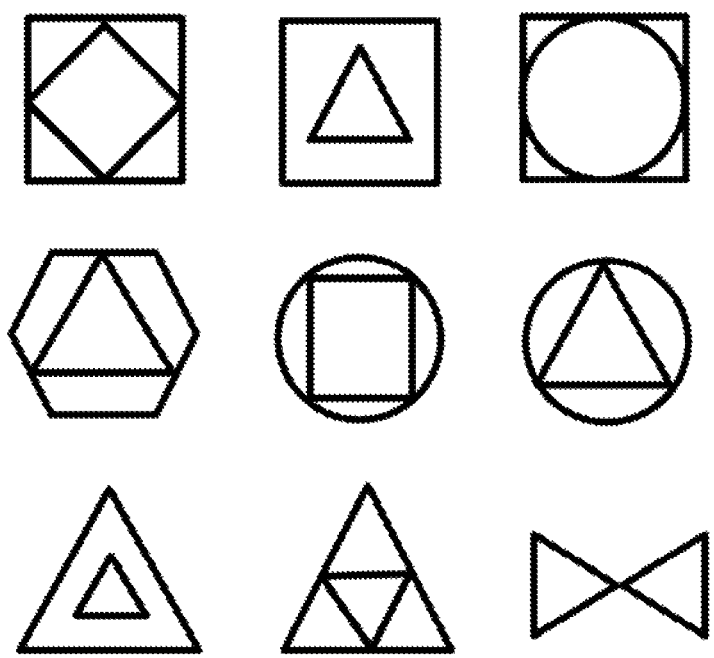
FIG. 10 illustrates distribution structures of an exemplary first repeating unit and second repeating unit consistent with disclosed embodiments.

FIG. 10 illustrates distribution structures of an exemplary first repeating unit and second repeating unit consistent with disclosed embodiments. In the disclosed embodiments, the repeating unit may be formed by combining the first repeating unit U1 and the second repeating unit U2. As shown in FIG. 10, the repeating unit may be the combination of any regular polygon or circle with another regular polygon or circle. In addition, the second repeating unit U2 may be located in the first repeating unit U1, the second repeating unit U2 may be located at the central region of the first repeating unit U1, the second repeating unit U2 may inscribe the first repeating unit U1, and the second repeating unit U2 may be located outside the first repeating unit U1 and connects to at least one point of the first repeating unit U1. The disclosure is not limited to the above embodiments, and any combination and deformation may be performed on the embodiments described above are within the scope of the present disclosure.

Figure 11:
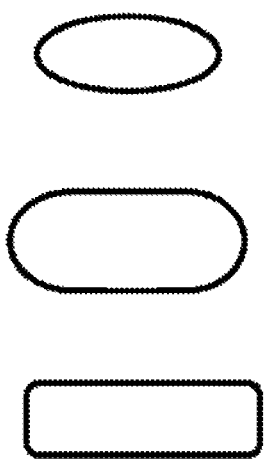
FIG. 11 illustrates cross-sectional shapes of an exemplary first photo spacer and second photo spacer consistent with disclosed embodiments.

FIG. 11 illustrates cross-sectional shapes of an exemplary first photo spacer and second photo spacer consistent with disclosed embodiments. As shown in FIG. 11, the cross-sectional shape of the first photo spacer and the second photo spacer may be an oval, a rectangle, or a rectangle with arced corners. The cross-sectional shape of the first photo spacer and the second photo spacer is not limited in this disclosure. In addition, the cross-sectional shapes of the first photo spacer and the second photo spacer may be the same or different. For example, the cross-sectional shape of the first photo spacer may be an oval and the cross-sectional shape of the second photo spacer may be a rectangle.

In the disclosed embodiments, the display panel includes a first substrate, a second substrate located opposite to the first substrate, and a plurality of first photo spacers located between the first substrate and the second substrate. At least three of the first photo spacers define a repeating unit. The repeating unit comprises a first repeating unit arranged in a first shape, and the first shape comprises a regular polygon or a circle.

In the disclosed embodiments, the display panel includes a first substrate, a second substrate located opposite to the first substrate, a plurality of first photo spacers located between the first substrate and the second substrate, and a second photo spacer located between the first substrate and the second substrate. The plurality of first photo spacers define a repeating unit arranged in a first shape. The first shape comprises a regular polygon or a circle. A height of the second photo spacer is lower than a height of the first photo spacer.

The repeating unit further comprises a second repeating unit arranged in a second shape. The second shape comprises a regular polygon or a circle.

Because the specific embodiment of the display device has been described above in the related embodiments of the organic light-emitting display panels, and therefore the description is not repeated in detail herein.

The present disclosure provides a display panel and a display device using the display panel. The photo spacers in the display panels form the first repeating unit arranged in the regular polygon or the circle. When the external pressure is applied to any position of the display panel, the external pressure may be more uniformly dispersed on the adjacent photo spacers, and therefore the pressure resistance of the display panel is improved and the mura effect of the display panel is prevented.

In other embodiments, the present disclosure provides a display panel and a display device using the display panel. When more photo spacers arranged in a regular polygon or a circle are applied in the first repeating unit, the external pressure may be further dispersed, and the pressure resistance of the display panel is therefore further improved and the mura effect is prevented.

The description of the disclosed embodiments is provided to illustrate the present invention to those skilled in the art. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A display panel, comprising:
    a first substrate;
    a second substrate located opposite to the first substrate; and
    a plurality of photo spacers located between the first substrate and the second substrate, wherein:
    the plurality of photo spacers defines a plurality of repeating unit groups, and each repeating unit group includes:
        a first plurality of the photo spacers connected to form a boundary of a first shape for a first repeating unit, the first shape being a regular polygon or a circle, and
        a second plurality of the photo spacers connected to form a boundary of a second shape for a second repeating unit,
    the first repeating unit and the second repeating unit each includes at least three of the plurality of photo spacers,
    all photo spacers are excluded from being located within the first shape of the first repeating unit and within the second shape of the second repeating unit, and
    the second repeating unit covers a central region of the first repeating unit.

2. The display panel according to claim 1, wherein the second shape is a regular polygon.

3. The display panel according to claim 1, wherein the second repeating unit is located in the first repeating unit and at the central region of the first repeating unit.

4. The display panel according to claim 1, wherein a center of the first repeating unit coincides with a center of the second repeating unit.

5. The display panel according to claim 1, wherein the second repeating unit is inscribed in the first repeating unit.

6. The display panel according to claim 1, wherein the second repeating unit is located outside the first repeating unit, and the first repeating unit connects to at least one point of the second repeating unit.

7. The display panel according to claim 1, wherein a radius of the first repeating unit ranges from approximately 30 μm to 70 μm.

8. The display panel according to claim 1, wherein the first repeating unit approximately covers 60-2100 sub-pixels, and the second repeating unit covers less than the number of sub-pixels covered by the first repeating unit.

9. The display panel according to claim 1, wherein a cross section of the photo spacer is an oval or a rectangle.

10. The display panel according to claim 1, wherein the first substrate is an array substrate, and the photo spacer is located on the array substrate.

11. The display panel according to claim 1, wherein the second substrate is a color film substrate, and the photo spacer is located on the color film substrate.

12. The display panel according to claim 1, wherein:
    the plurality of photo spacers located between the first substrate and the second substrate is a plurality of first photo spacers, and
    the display panel further includes a plurality of second photo spacers, wherein the second photo spacers are located between the first substrate and the second substrate, and a height of the second photo spacers is lower than a height of the first photo spacers.

13. The display panel according to claim 12, wherein the repeating unit comprises at least one second photo spacer.

14. The display panel according to claim 1, wherein:
    the second shape is a circle.

15. The display panel according to claim 1, wherein a cross section of the photo spacer is a rectangle.

16. A display device, comprising:
    a display panel, the display panel comprising:
        a first substrate;
        a second substrate located opposite to the first substrate; and
        a plurality of photo spacers located between the first substrate and the second substrate, wherein:
        the plurality of photo spacers defines a plurality of repeating units groups, and each repeating unit group includes:
            a first plurality of the photo spacers connected to form a boundary of a first shape for a first repeating unit, and the first shape being a regular polygon or a circle, and
            a second plurality of the photo spacers connected to form a boundary of a second shape for a second repeating unit,
        the first repeating unit and the second repeating unit each includes at least three of the plurality of photo spacers,
        all photo spacers are excluded from being located within the first shape of the first repeating unit and within the second shape of the second repeating unit, and
        the second repeating unit covers a central region of the first repeating unit.

17. The display device according to claim 16, wherein the second shape is a regular polygon.

* * * * *